United States Patent
Showers et al.

(10) Patent No.: US 8,805,825 B1
(45) Date of Patent: Aug. 12, 2014

(54) ATTRIBUTE PRIORITIZED CONFIGURATION USING A COMBINED CONFIGURATION-ATTRIBUTE DATA MODEL

(75) Inventors: Brian K. Showers, Cedar Park, TX (US); Brandon M. Beck, Austin, TX (US); Nathan E. Little, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 80 days.

(21) Appl. No.: 11/034,141

(22) Filed: Jan. 12, 2005

(51) Int. Cl.
*G06F 7/00* (2006.01)

(52) U.S. Cl.
USPC .......................................... 707/723; 705/26.5

(58) Field of Classification Search
USPC .......................................... 707/723; 705/26.5
See application file for complete search history.

(56) References Cited

U.S. PATENT DOCUMENTS

| | | | |
|---|---|---|---|
| 5,515,524 A | 5/1996 | Lynch et al. | |
| 5,708,798 A | 1/1998 | Lynch et al. | |
| 5,825,651 A | 10/1998 | Gupta et al. | |
| 6,002,854 A | 12/1999 | Lynch et al. | |
| 6,405,308 B1 | 6/2002 | Gupta et al. | |
| 6,549,908 B1* | 4/2003 | Loomans | 707/101 |
| 6,675,294 B1 | 1/2004 | Gupta et al. | |
| 6,725,257 B1* | 4/2004 | Cansler et al. | 709/219 |
| 6,810,406 B2* | 10/2004 | Schlabach et al. | 707/201 |
| 6,871,198 B2* | 3/2005 | Neal et al. | 1/1 |
| 7,043,407 B2 | 5/2006 | Lynch et al. | |
| 7,043,464 B2* | 5/2006 | Abrahams | 706/14 |
| 7,127,313 B2* | 10/2006 | Neri | 700/103 |
| 7,140,013 B2* | 11/2006 | Te'eni et al. | 717/173 |
| 7,200,582 B1 | 4/2007 | Smith | |
| 7,200,583 B1* | 4/2007 | Shah et al. | 706/47 |
| 7,216,092 B1* | 5/2007 | Weber et al. | 705/26 |
| 7,552,102 B2* | 6/2009 | Huelsman et al. | 706/47 |
| 2004/0122807 A1* | 6/2004 | Hamilton et al. | 707/3 |
| 2005/0144090 A1* | 6/2005 | Gadamsetty et al. | 705/26 |
| 2006/0111878 A1* | 5/2006 | Pendyala et al. | 703/1 |
| 2007/0233730 A1* | 10/2007 | Johnston | 707/104.1 |

\* cited by examiner

*Primary Examiner* — Sherief Badawi
*Assistant Examiner* — Christopher J Raab
(74) *Attorney, Agent, or Firm* — Terrile, Cannatti, Chambers & Holland, LLP; Kent B. Chambers (57) ABSTRACT

A combined configuration rules-attribute configuration system uses an integrated configuration model to efficiently identify and attribute prioritize valid configuration answers. Submitting an attribute-based configuration query to the combined configuration rules-attribute configuration system allows the query to be answered in a single step. The combined configuration rules and attribute data guide product configuration processing and minimize configuration processing by, for example, calculating only the valid configuration answers that are candidates for the preferred valid answer(s). Thus, the combined configuration rules-attribute configuration system can minimize the number of valid configuration answers to be considered for presentation to a client system or other user of the combined configuration rules-attribute configuration system.

20 Claims, 9 Drawing Sheets

ATTRIBUTE PRIORITIZED CONFIGURATION USING A COMBINED CONFIGURATION-ATTRIBUTE DATA MODEL

BACKGROUND OF THE INVENTION

1. Field of the Invention

The present invention relates in general to the field of information processing, and more specifically to a system and method for prioritizing configuration using a combined configuration-attribute data model.

2. Description of the Related Art

Figure 1:
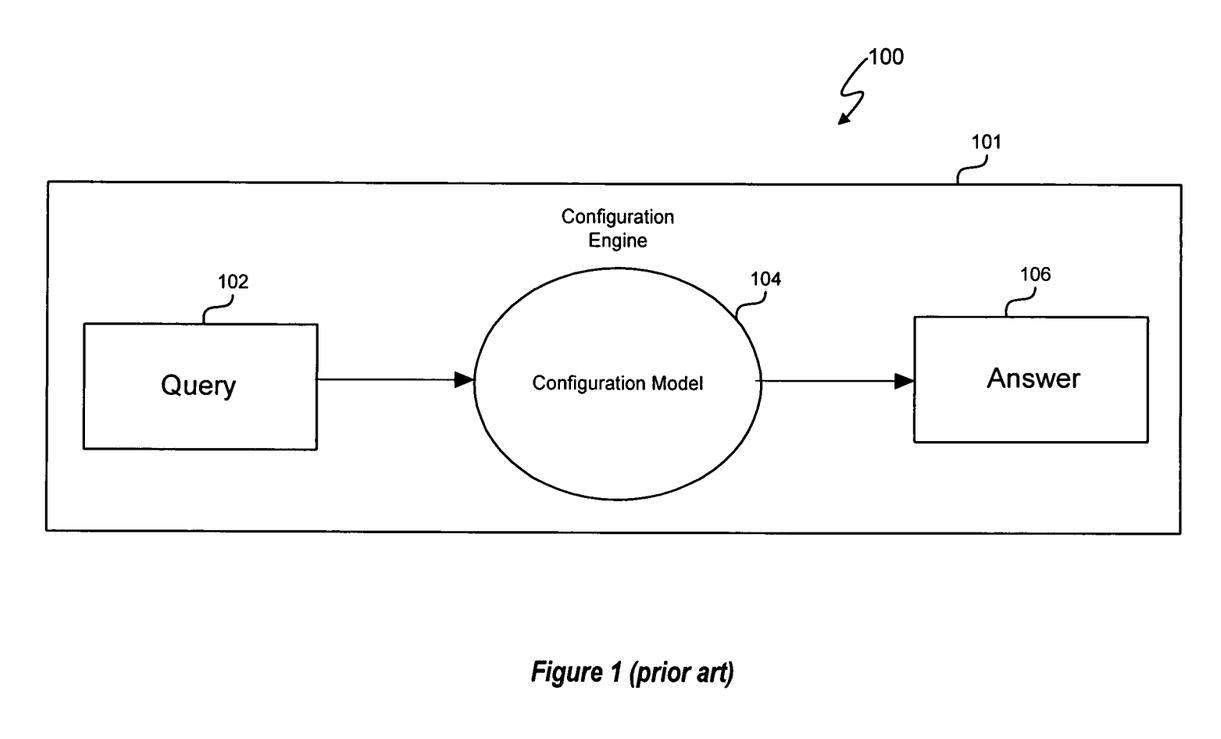
FIG. 1 (prior art) depicts a conventional product configuration process.

Computer assisted product configuration continues to offer substantial benefits to a wide range of users and industries. FIG. 1 depicts a conventional product configuration process 100 performed by a configuration engine 101. The configuration process 100 represents one embodiment of an inference procedure. In one embodiment of a conventional inference procedure, configuration query 102 is formulated based on user configuration input, a configuration engine performs the configuration query 102 using a configuration model 104, and the configuration engine provides an answer 106 to the configuration query 102 based on the configuration query 102 and the contents of the configuration model 104. The answer 106 represents a particular response to the configuration query 102.

A configuration model 104 uses, for example, data, rules, and/or constraints (collectively referred to as "data") to define compatibility relationships between parts (also commonly referred to as "features") contained in a specific type of product. A part represents a single component or attribute from a larger, more complex system. Parts may be combined in different ways in accordance with rules and/or constraints to define different instances of the more complex system. For example, "V6 engine" or the exterior color "red" can be parts on a vehicle, and a specific hard disk drive can be a part on a computer. A part group, also called a group or family, represents a collection of related parts. For example, an "Engines" group might contain the parts "V6 engine" and "4 cylinder engine". A product configuration is a set of parts that define a product. For example, a vehicle configuration containing the parts "V6 engine" and "red" represents a physical vehicle that has a red exterior and a V6 engine. A product can be a physical product such as a vehicle, computer, or any other product that consists of a number of configurable features such as an insurance product. Additionally, a product can also represent a service such as financial services, insurance services, or consulting services.

An attribute represents a particular detail about a part or part group. Attributes describe details about the part or part group. A single part or part group can have many attributes. For example, the part "V6 engine" might have a price attribute of "$500", a weight attribute of "1,000 lbs" and a description attribute of "Six cylinder gas engine." Also, an attribute for a given part or part group may change depending on context (what other parts or attributes are present). For example, the price attribute for the "V6 engine" might be "$500" when the "XLT trim" part is present and the price attribute for the "V6 Engine" might be "$800" when the "XL trim" part is present.

A configuration query (also referred to as a "query") is essentially a question that is asked about the parts, relationships, and attributes in a configuration model. The answer returned from a configuration query will depend on the data in the configuration model, the approach used for answering the question, and the specifics of the question itself. For example, one possible configuration query, translated to an English sentence, is the following: For the given configuration model, are the parts "red" and "V6 engine" compatible with each other? Another possible configuration query is the following: For the given configuration model, is the "V6 engine" part standard or optional when in the presence of the "XLT trim", "XL trim", "USA", and "Canada" parts, wherein "standard" and "optional" are attributes?

The configuration model 104 can be used to determine, for example, which parts are compatible with other parts, and provide additional details around specific relationships. For example, a vehicle configuration model can indicate that "red" (a part) is the standard feature from the color part group for a specific vehicle and "red" is not compatible with "V6 engine" (a part). Configuration model 104 may also contain additional information needed to support specific product related queries. Configuration models can be developed in any number of ways. U.S. Pat. No. 5,825,651 entitled "Method and Apparatus for Maintaining and Configuring Systems", inventors Gupta et al., and assigned to Trilogy Development Group, Inc., describes an example configuration engine and rules based configuration model. U.S. Pat. No. 5,825,651 (referred to herein as the "Gupta Patent") is incorporated herein by reference in its entirety. U.S. Pat. No. 5,515,524 entitled "Method and Apparatus for Configuring Systems", inventors John Lynch and David Franke, and assigned to Trilogy Development Group, Inc., describes another example configuration engine and constraint based configuration model. U.S. Pat. No. 5,515,524 (referred to herein as the "Lynch Patent") is also incorporated by reference in it entirety.

Figure 2:
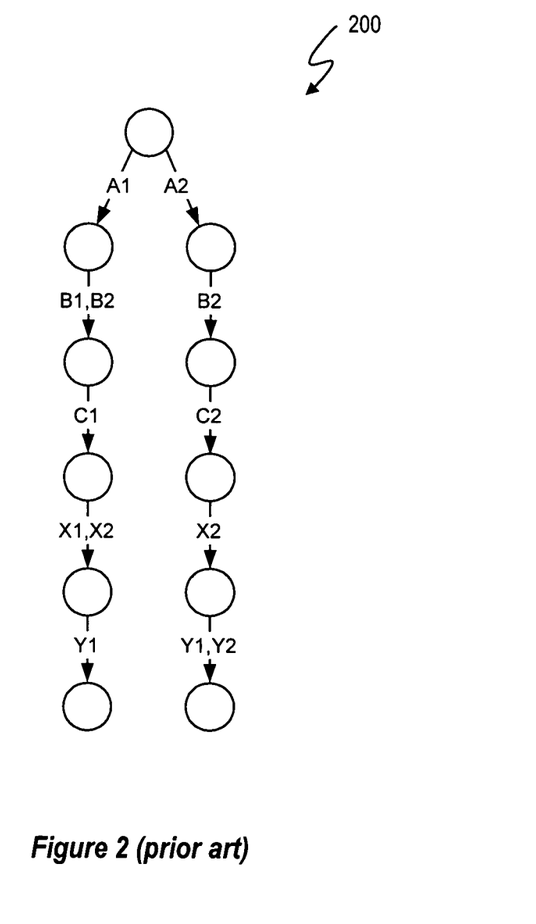
FIG. 2 (prior art) depicts a configuration model in graphical, tree based form.

FIG. 2 depicts an example configuration model 200 of a product represented in a graphical, tree based form. The product can be configured to include part combinations A1, B1 or B2, C1, X1 or X2, and Y1 or configured to include part combinations A2, B2, C2, X2, and Y1 or Y2. The configuration model 200 includes rules to define these part relationships. Table 1 represents an example rule set, wherein "S" represents "standard" and "O" represents optional. Configuration model 200 represents a relatively non-complex configuration model. Actual configuration models for a single product can include hundreds of thousands or more parts, rules, and attributes.

TABLE 1

| Example Configuration Rules for a Product |
|---|
| A1 S ALL |
| A2 O ALL |
| B1 S A1 |
| B2 S A2 |
| B2 O A1 |
| C1 S A1 |
| C2 S A2 |
| X1 S C1 |
| X2 S C2 |
| X2 O C1 |
| Y1 S C1 |
| Y1 S C2 |
| Y2 O C2 |

Many configuration queries are formulated with respect to attribute values. Such processing is referred to herein as "attribute-based configuration" Attributes can (1) be used to find "preferred" answers to configuration queries (such queries are referred to herein as "attribute-prioritized queries"), (2) be an output of a configuration query (such queries are referred to herein as "attribute queries"), and (3) be used in a query that is both an attribute-prioritized query and an attribute query. An example of an attribute-prioritized query is the following: "Given a set of configured parts, return the part with the lowest cost that is compatible with the given parts, according to the rules in a given configuration model". An example of an attribute query is the following: "Given a configuration model and a fully specified configuration, determine the sum of the price attributes for all of the parts in that configuration." Attribute-based configuration processing has conventionally suffered from scale and performance issues, an example of which is described below.

Example: A Conventional Approach to Attribute-Prioritized Solutions

When more than one answer to a configuration query is valid, the attributes of each configuration answer can be used to assign a preference weighting to the valid answers. For example, there may be many answers that satisfy the configuration query of "Add parts to the list of 'red' and 'V6 engine' until a complete vehicle is specified." However, attribute values can be used to identify preferred valid answers such as the least expensive vehicle, the most expensive vehicle, the heaviest vehicle, etc.

Figure 3:
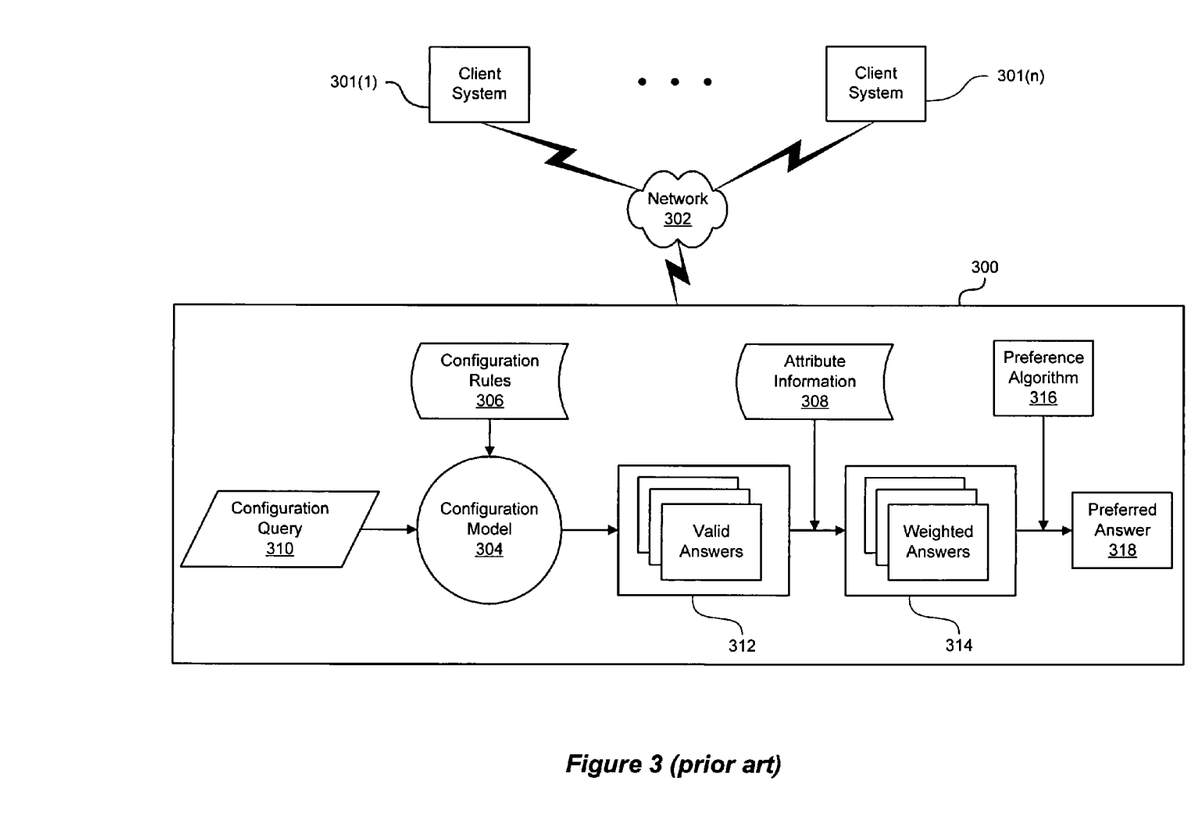
FIG. 3 (prior art) depicts a conventional attribute based priority solution system.
Figure 4:
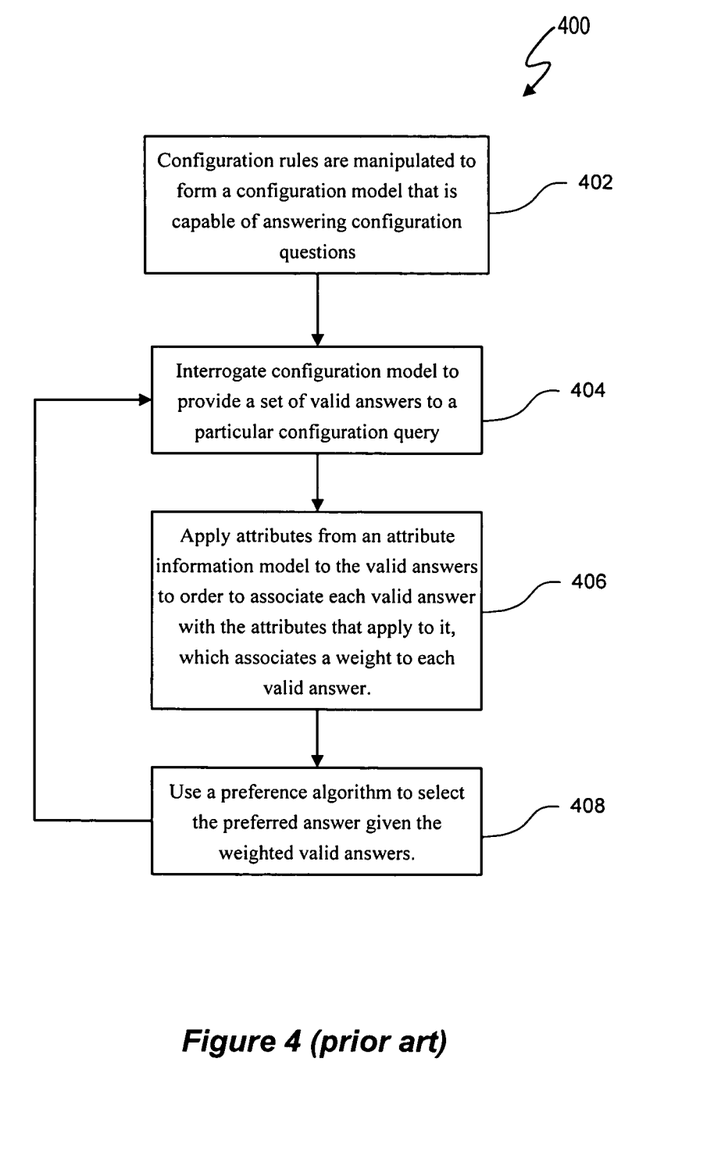
FIG. 4 (prior art) depicts a conventional attribute based priority solution process.

FIG. 3 depicts a conventional attribute based priority configuration system 300 (also referred to as a "conventional attribute based priority configuration engine"), and FIG. 4 depicts a conventional attribute based priority solution process 400 to determine an attribute based priority solution. Client systems 301(1) through 301(n) access the conventional attribute based priority solution system 300 via a network 302, such as the Internet. The system 300 and process 400 are typically implemented configured as a server computer system.

Conventionally, a configuration model 304 is driven solely by configuration rules 306. Thus, in operation 402, configuration rules 306 are manipulated to form a configuration model 304 that is capable of answering configuration questions. The configuration model 304 is separated from attribute information 308 and, thus, the configuration model 304 is not used to process attribute related data. In operation 404, the conventional attribute based priority solution process 400 answers an attribute specific configuration query 310 to determine an attribute based priority solution by querying configuration model 304 for the set of valid answers 312. The valid answers 312 represent product configurations that conform to the configuration model 304. Operation 404 interrogates the configuration model 304 to find the preferred answer from the set of valid answers. Operation 406 then applies attribute information 308 to the valid answers 312 to associate each valid answer with the attributes that apply to the valid answer. A weight can be derived from the applied attribute information 308 to generate weighted answers 314. For example, for the attributes "standard" and "optional", the weight can be the total number of standard features or the total number optional features in each answer. Operation 408 uses a preference algorithm 316, e.g. search for the valid answer with the most standard features and lowest price, to select the preferred valid answer 318 given the weighted valid answers. The particular preference algorithm is a matter of system usage. Once a preferred answer is selected, conventional attribute based priority solution process 400 can determine answers for the next configuration query.

A software application developed by Trilogy Development Group, Inc. and referred to as "MCC Config" implemented the conventional attribute based priority configuration system 300 using a modified attribute based priority solution process 400. MCC Config solved a configuration problem by taking partial configuration answers as input data and over iterative processes, provided a complete configuration output. The modified process was an iterative process that created a single, preferred complete configuration over multiple iterations, rather than providing all valid complete configurations and choosing a preferred one. For each iteration the configuration model 304 provided a set of part selections. The set of part selections formed a subset of all of the part selections that needed to be made to generate a preferred, complete configuration. The modified process then used the attribute information 308 and the preference algorithm 316 to make the part selections provided by the configuration model 304. Part selections answers were then fed back into the configuration model 304 and added to the partial configuration answers. The partial configuration answers were then used by the configuration model 304 to generate the next set of part selections that needed to be made, and so on until the configuration was completed. For example, in an automotive configuration context, a user could initially select: engine=V6 and color=red. The configuration engine could determine that, for example, 2 different transmissions and 6 different body styles were compatible with engine=V6 and color=red. The modified process would then select a transmission and body style from the set of transmissions and body styles provided according to the preference algorithm 316. If "standard" was the controlling preference in the preference algorithm 316, the modified process would select the standard transmission and body style, if possible, from the available choices. The selected transmission and body style would then be added to the initial user selections and the process would repeat until a complete configuration was attained.

Process 400 exhibits the drawback of expending effort to determine valid answers that will eventually be ignored if they are not preferred by the attribute model. Also, the number of valid answers can be so large that calculating the full set and identifying the preferred answer is often computationally infeasible.

SUMMARY OF THE INVENTION

In one embodiment of the present invention, a method for using computer assisted configuration technology to generate one or more attribute prioritized configuration answers to one or more configuration queries includes receiving one or more configuration queries from a client system. The method further includes processing the one or more configuration queries using a combined configuration rules-attributes model to determine valid configuration answers prioritized by one or more predetermined attributes and providing at least a subset of the valid configuration answers to the client system.

In another embodiment of the present invention, a computer system to generate one or more attribute prioritized configuration answers to one or more configuration queries includes a processor and a storage medium having data encoded therein. The data includes processor executable code for:
  receiving one or more configuration queries from a client system;
  processing the one or more configuration queries using a combined configuration rules-attributes model to determine valid configuration answers prioritized by one or more predetermined attributes; and
  providing at least a subset of the valid configuration answers to the client system.

In another embodiment of the present invention, a computer storage medium includes data embedded therein to cause a computer system to generate one or more attribute prioritized configuration answers to one or more configuration queries. The data includes processor executable code for:

receiving one or more configuration queries from a client system;

processing the one or more configuration queries using a combined configuration rules-attributes model to determine valid configuration answers prioritized by one or more predetermined attributes; and providing the valid configuration answers to the client system.

In another embodiment of the present invention, a computer system to generate one or more attribute prioritized configuration answers to one or more configuration queries includes means for receiving one or more configuration queries from a client system. The computer system further includes means for processing the one or more configuration queries using a combined configuration rules-attributes model to determine valid configuration answers prioritized by one or more predetermined attributes and means for providing at least a subset of the valid configuration answers to the client system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A combined configuration rules-attribute configuration system uses an integrated configuration model to efficiently identify and attribute prioritize valid configuration answers to attribute-prioritized configuration queries. Submitting an attribute-based configuration query to the combined configuration rules-attribute configuration system allows the query to be answered in a single step. The combined configuration rules and attribute information guide product configuration processing and minimize configuration processing by, for example, calculating only the valid configuration answers that are candidates for the preferred valid answer(s). Thus, the combined configuration rules-attribute configuration system can minimize the number of valid configuration answers to be considered for presentation to a client system or other user of the combined configuration rules-attribute configuration system.

Figure 5:
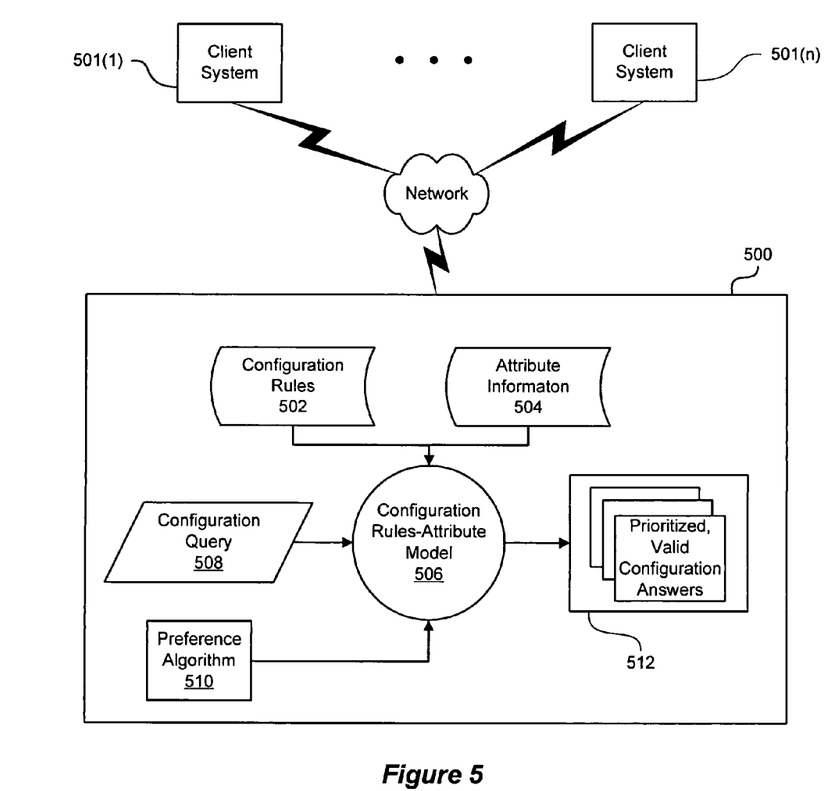
FIG. 5 depicts a combined configuration rules-attribute configuration system.
Figure 6:
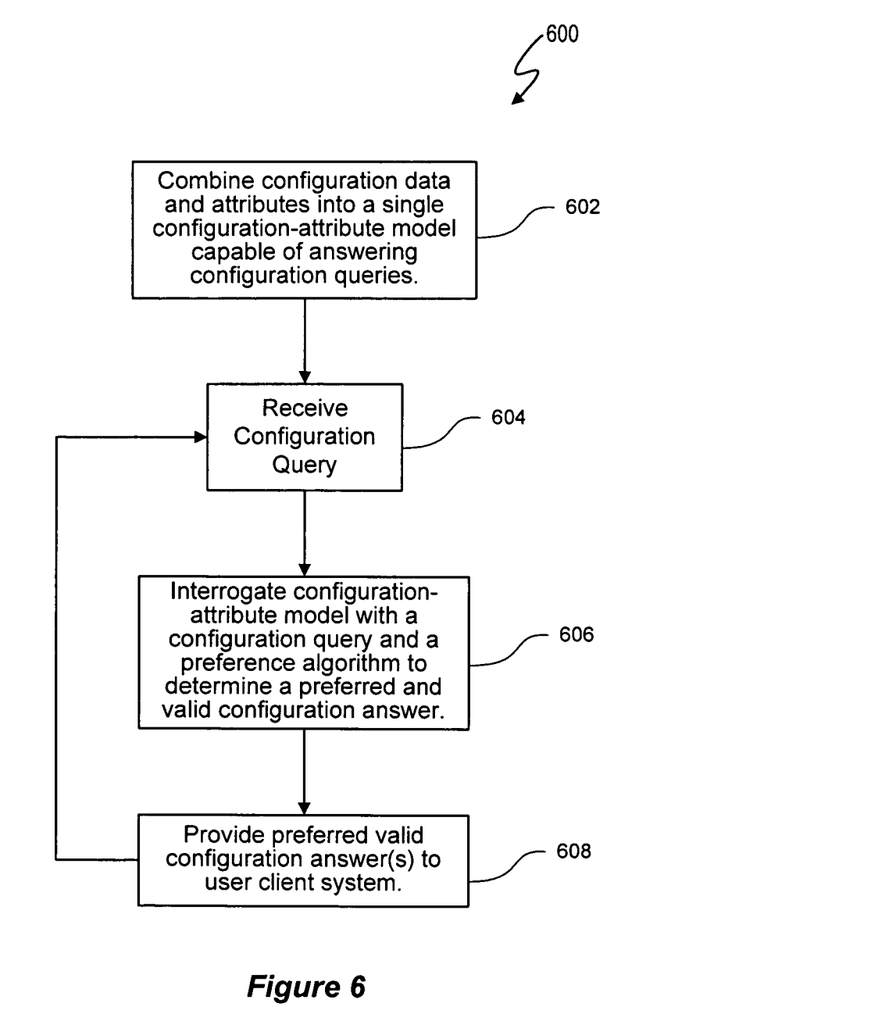
FIG. 6 depicts a combined configuration rules-attribute configuration process.

FIG. 5 depicts combined configuration rules-attribute configuration system 500 communicatively coupled to client systems 501(1) through 501(n) via a network such as the Internet, wherein n≥1. The combined configuration rules-attribute configuration system 500 can also be referred to as a configuration engine. Combined configuration rules-attribute configuration system 500 operates in accordance with combined configuration rules-attribute configuration process 600. Operation 602 integrates configuration rules 502 and attribute information 504 into a configuration rules-attribute model 506. Configuration rules 502 are any type of configuration rules data such as the configuration rules described with reference to Table 1. As described above, attributes can represent any particular detail about a part or part group. Table 2 sets forth example attribute types. An attribute can also be an aggregate of other attributes. For example, a part group price may be an aggregate of prices for other parts and/or part groups.

TABLE 2

| Example Attribute Types |
| --- |
| Standard |
| Optional |
| Price |
| Weight |
| Towing Capacity |
| Description |
| Warranty |
| Fuel Efficiency |

The implementation of configuration rules-attributes model 506 is a matter of design choice. In one embodiment, the configuration rules-attributes model 506 is implemented as a trie, and trie operations are used to manipulate the data. Example tries and trie operations are set forth in U.S. Pat. No. 7,200,582, issued Apr. 3, 2007, entitled "Configuration Model Consistency Checking Using Flexible Rule Space Subsets", inventor Shawn A. P. Smith, filing date Mar. 31, 2003, and assigned to Trilogy Development Group, Inc. U.S. Pat. No. 7,200,582 is hereby incorporated by reference in its entirety.

Figure 7:
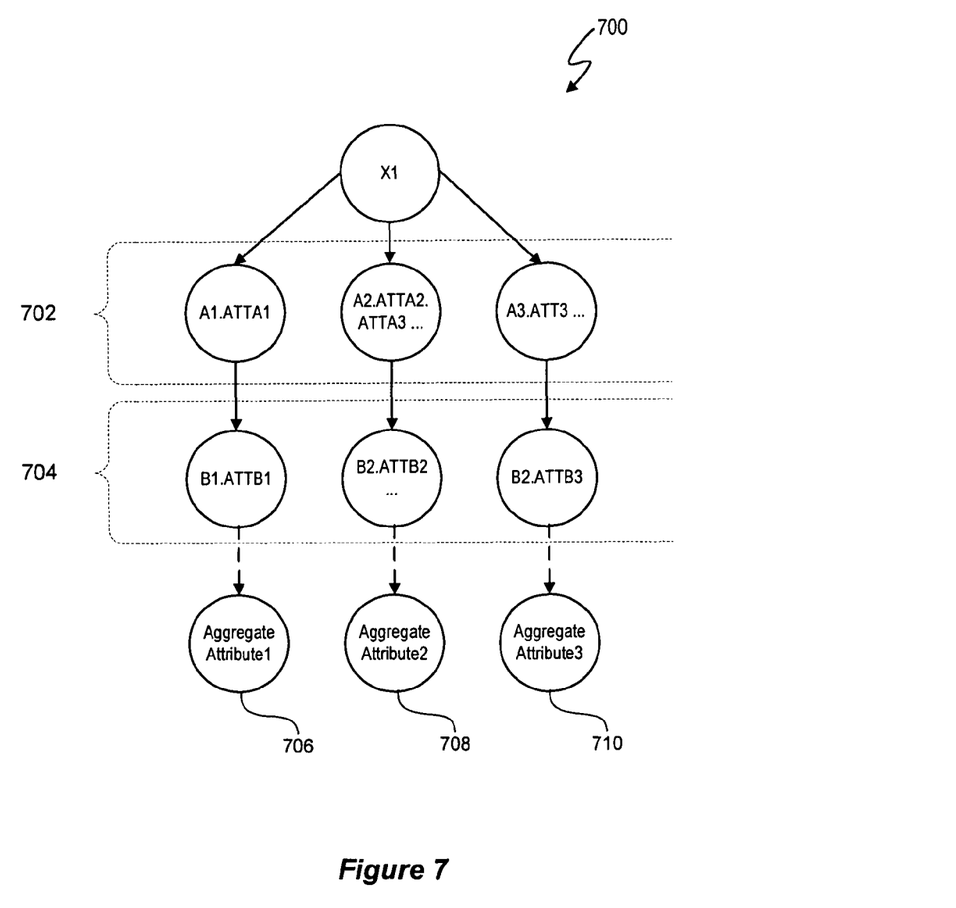
FIG. 7 depicts an example trie implementation of a configuration rules-attributes model.

FIG. 7 depicts an example trie implementation of configuration rules-attributes model 506. The trie implemented configuration rules-attributes model 700 includes a root node X1 and two part groups 702 and 704. Each complete branch of the model 700 represents a valid configuration. A trie-based representation can be used to represent the valid combinations in a compact and precise manner. Nodes in part group 702 contain parts A1, A2, and A3. Each of the parts A1, A2, and A3 may be annotated with one or more associated attributes such as ATTA1, ATTA2, and ATTA3. Each of the parts B1 and B2 may include one or more attributes such as ATTB1 and ATTB2. The attributes associated with different parts may be the same or may be different. Model 700 additionally includes leaf nodes 706, 708, and 710 with associated aggregate attribute values. For example, each leaf node could include the total number of standard parts in the product represented by the valid configuration branch to which the leaf node is attached and/or could include the price of the product represented by the valid configuration branch to which the leaf node is attached.

In one embodiment, "release" attributes are combined with configuration rules to form the configuration rules-attributes model 506. "Release" attributes describe how a part is available within a valid configuration context. For example, release attributes could specify that the "V6 engine is the 'standard' engine" and the "V8 engine is an 'optional' engine." Thus, in one embodiment, the configuration rules-attributes model 506 not only represents which combinations of parts are valid together but also how those parts are released.

Referring to FIGS. 5, 6, and 7, client systems 501(1) through 501(n) each access combined configuration rules-attribute configuration system 500 to configure a product by submitting a respective configuration query 508. The particular data structure(s) used to represent configuration query 508 is a matter of design choice and depends upon, for example, configuration engine specifications, etc. In one example, the configuration query 508 results from the selection of a particular feature displayed via a web browser application executed by client system 501(i), wherein i is an element of the set {1, . . . , n}. The combined configuration rules-attribute configuration system 500 receives the configuration query 508 in operation 604. In operation 606, combined configuration rules-attribute configuration system 500 interrogates configuration rules-attributes model 506 with configuration query 508 and an attribute based preference algorithm 510 to determine a set of one or more attribute prioritized, valid configuration answers 512. In one embodiment, combined configuration rules-attribute configuration system 500 processes the configuration query 508 and configuration rules of configuration rules-attributes model 506 in accordance with the Gupta Patent or the Lynch Patent.

The preference algorithm 510 is a matter of system usage and depends upon which preferences are anticipated to be consistent with the user preferences of client system 501(i). For example, the user of client 501(i) could select the preference(s) for valid configuration answers or some or all of the preference(s) could be predetermined by combined configuration rules-attribute configuration system 500. In one embodiment, a preference is for maximizing the number of standard parts. Thus, only valid configurations with a maximum number of standard parts or a number of standard parts that is greater than or equal to a predetermined threshold are determined to be valid answers. In another embodiment, only valid configurations that have a towing capacity greater than or equal to a predetermined threshold are determined to be valid answers. The preference algorithm can then prioritize valid configurations based upon evaluation of more than one type of attribute. For example, only valid configuration answers with a maximum number of standard parts, a fuel efficiency greater than or equal to a predetermined threshold, and a price less than or equal to a predetermined threshold are presented to a user. The valid answers can be prioritized in accordance with one or more attribute values. For example, valid answers can be ordered based on lowest to highest price.

Thus, operation 606 uses the configuration rules-attributes model 506 to process each configuration query 508 with valid answers determined in accordance with preference algorithm 510. For example, the preference algorithm could prefer valid configurations that maximize the combined number of standard-attribute features in the answer. For example, the configuration query 506 might be to "Find the complete configuration that contains that parts "red" and "V6" and maximizes the number of standard-attribute parts." There could be many possible configurations that contain "red" and "V6" but the configuration rules-attributes model 506 allows operation 606 to single out the valid answers that meet the preference algorithm. Thus, operation 606 does not spend resources calculating other "red" and "V6" configurations that do not contain the maximal number of standard parts.

Once operation 606 determines one or more prioritized, valid configuration answers 512, operation 608 provides the attribute prioritized, valid configuration answer(s) 512 to the client system 501(i) that submitted the configuration query 508. The number of prioritized, valid configuration answers can be a predefined number or a user selected number. For example, if "standard" and "price" are the controlling preferences, only "X" valid configuration answers 512 are provided to the user, where X is the predefined or user selected number. The combined configuration rules-attribute configuration process 600 then returns to operation 604 to process a subsequent configuration query 508.

Thus, it is often the case that a single set of configuration rules and a single set of attributes will be used to perform many configuration queries. By using a configuration rules-attributes model 506 to perform product configurations in accordance with configuration query 508, the combined configuration rules-attribute configuration process 600 is able to realize several performance and complexity benefits.

Using a combined configuration rules-attributes model 506 to process configuration queries allows the performance impact of combining multiple attributes, e.g. maximizing the number(s) of a certain attribute(s) or totaling the values of certain attributes, to be minimized by pre-processing combinations of multiple attributes of valid configurations and amortizing the preprocessed combinations over many queries. Thus, attributes and rules may be static while the configuration query 508 and preference algorithm 510 may change more quickly. If the process of combining multiple attributes (e.g. adding the number of standard attributes) is slow, the combinations of multiple attributes can be pre-calculated, stored in memory, and then used for many different configuration query/preference algorithm pairs.

By processing a single query against the combined configuration rules-attributes model 506, the combined configuration rules-attribute configuration process 600 does not need to evaluate non-preferred answers, which increases the performance of combined configuration rules-attribute configuration system 500 and lowers the resources necessary to process a configuration query 506.

The number of preferred configuration answers provided to the user can be limited to reduce the amount of information provided to the user that has a low probability of relevancy to the user.

Figure 8:
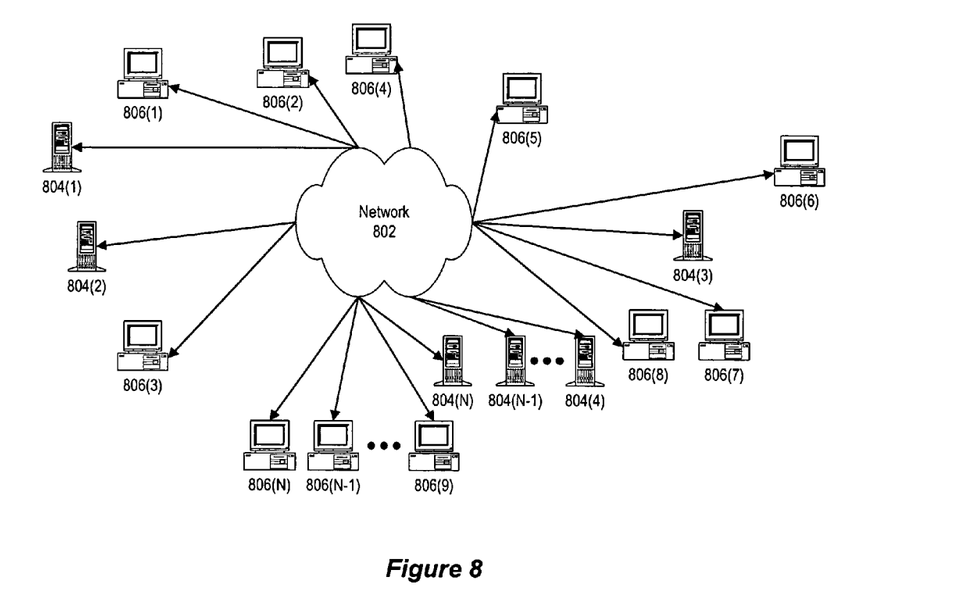
FIG. 8 depicts a block diagram illustrating a network environment in which the system and process of FIGS. 5 and 6 may be practiced.

FIG. 8 is a block diagram illustrating a network environment in which a combined configuration rules-attribute configuration system 500 and combined configuration rules-attribute configuration process 600 may be practiced. Network 802 (e.g. a private wide area network (WAN) or the Internet) includes a number of networked server computer systems 804(1)-(N) that are accessible by client computer systems 806(1)-(N), where N is the number of server computer systems connected to the network. Communication between client computer systems 806(1)-(N) and server computer systems 804(1)-(N) typically occurs over a network, such as a public switched telephone network over asynchronous digital subscriber line (ADSL) telephone lines or high-bandwidth trunks, for example communications channels providing T1 or OC3 service. Client computer systems 806(1)-(N) typically access server computer systems 804(1)-(N) through a service provider, such as an internet service provider ("ISP") by executing application specific software, commonly referred to as a browser, on one of client computer systems 806(1)-(N).

Client computer systems 806(1)-(N) and/or server computer systems 804(1)-(N) may be, for example, computer systems of any appropriate design, including a mainframe, a mini-computer, a personal computer system including notebook computers, a wireless, mobile computing device (including personal digital assistants). These computer systems are typically information handling systems, which are designed to provide computing power to one or more users, either locally or remotely. Such a computer system may also include one or a plurality of input/output ("I/O") devices coupled to the system processor to perform specialized functions. Mass storage devices such as hard disks, compact disk ("CD") drives, digital versatile disk ("DVD") drives, and magneto-optical drives may also be provided, either as an integrated or peripheral device. One such example computer system is shown in detail in FIG. 9.

Figure 9:
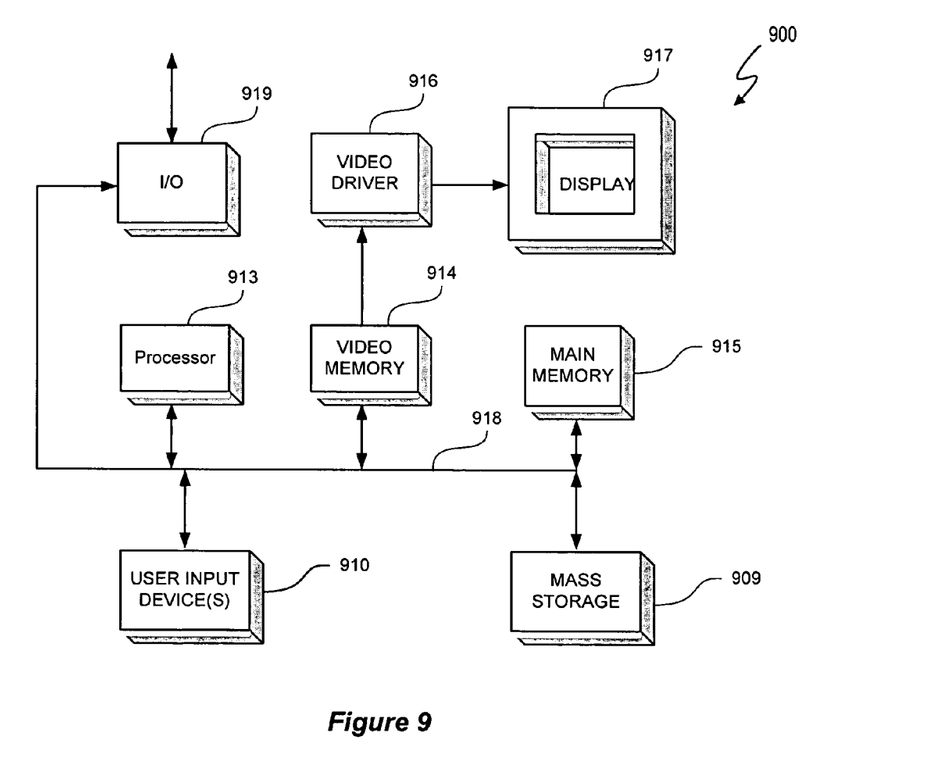
FIG. 9 depicts an example data processing system used in the network of FIG. 8.

Embodiments of combined configuration rules-attribute configuration system 500 and combined configuration rules-attribute configuration process 600 can be implemented on a computer system such as a general-purpose computer 900 illustrated in FIG. 9. Input user device(s) 910, such as a keyboard and/or mouse, are coupled to a bi-directional system bus 918. The input user device(s) 910 are for introducing user input to the computer system and communicating that user input to processor 913. The computer system of FIG. 9 generally also includes a video memory 914, main memory 915 and mass storage 909, all coupled to bi-directional system bus 918 along with input user device(s) 910 and processor 913. The mass storage 909 may include both fixed and removable media, such as other available mass storage technology. Bus 918 may contain, for example, 32 address lines for addressing video memory 914 or main memory 915. The system bus 918 also includes, for example, an n-bit data bus for transferring DATA between and among the components, such as CPU 909, main memory 915, video memory 914 and mass storage 909, where "n" is, for example, 32 or 64. Alternatively, multiplex data/address lines may be used instead of separate data and address lines.

I/O device(s) 919 may provide connections to peripheral devices, such as a printer, and may also provide a direct connection to remote server computer systems via a telephone link or to the Internet via an ISP. I/O device(s) 919 may also include a network interface device to provide a direct connection to remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 909 until loaded into main memory 915 for execution. Computer programs may also be in the form of electronic signals modulated in accordance with the computer program and data communication technology when transferred via a network.

The processor 913, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 915 is comprised of dynamic random access memory (DRAM). Video memory 914 is a dual-ported video random access memory. One port of the video memory 914 is coupled to video amplifier 916. The video amplifier 916 is used to drive the display 917. Video amplifier 916 is well known in the art and may be implemented by any suitable means. This circuitry converts pixel DATA stored in video memory 914 to a raster signal suitable for use by display 917. Display 917 is a type of monitor suitable for displaying graphic images.

The computer system described above is for purposes of example only. The combined configuration rules-attribute configuration system 500 and combined configuration rules-attribute configuration process 600 may be implemented in any type of computer system or programming or processing environment. It is contemplated that the combined configuration rules-attribute configuration system 500 and combined configuration rules-attribute configuration process 600 might be run on a stand-alone computer system, such as the one described above. The combined configuration rules-attribute configuration system 500 and combined configuration rules-attribute configuration process 600 might also be run from a server computer systems system that can be accessed by a plurality of client computer systems interconnected over an intranet network. Finally, the combined configuration rules-attribute configuration system 500 and combined configuration rules-attribute configuration process 600 may be run from a server computer system that is accessible to clients over the Internet.

Many embodiments of the present invention have application to a wide range of industries and products including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it should be understood that various changes, substitutions and alterations can be made hereto without departing from the spirit and scope of the invention as defined by the appended claims.

What is claimed is:

1. A method for using computer assisted configuration technology to generate one or more attribute prioritized configuration answers to one or more attribute-based configuration queries, the method comprising:

performing by a computer system programmed with code stored in a memory and executable by a processor of the computer system to configure the computer system into a machine for:

receiving one or more attribute-based configuration queries from a client system, wherein the attribute-based configuration queries include a selection of one or more parts of a product;

processing the one or more attribute-based configuration queries, configuration rules, and attribute based preference algorithm using a combined configuration rules-attributes model and a configuration-rules processing engine to calculate valid configuration answers in accordance with the combined configuration rules-attributes model, wherein a plurality of the configuration rules define relationships between parts of the product and a plurality of attributes represent details about the parts;

predetermining values of one or more combinations of attributes associated with respective configuration answers;

storing the predetermined values;

retrieving the stored predetermined values associated with a particular valid configuration answer if the particular valid configuration is an answer to one or more of the attribute-based configuration queries;

receiving a selection of at least one of the one or more product attributes to be prioritized;

prioritizing the valid configuration answers by one or more of the plurality of attributes in the combined configuration rules-attributes model; and providing at least a subset of the valid configuration answers to the client system, wherein the provided valid configuration answers are prioritized by one or more of the plurality of attributes.

2. The method of claim 1 wherein to calculate valid configuration answers prioritized by one or more predetermined attributes comprises:
  processing valid configuration answers with an attribute based preference algorithm.

3. The method of claim 1 wherein providing at least a subset of the valid configuration answers to the client system comprises providing a predetermined number of attribute-prioritized valid configuration answers to a user.

4. The method of claim 1 wherein providing at least a subset of the valid configuration answers to the client system comprises providing a user selected number of attribute-prioritized valid configuration answers to a user.

5. The method of claim 1 wherein the one or more attribute-based configuration queries comprise attribute-based configuration queries to configure at least one of the products from the group comprising: vehicles, computers, and financial products.

6. A computer system to generate one or more attribute prioritized configuration answers to one or more attribute-based configuration queries, the system comprising:
  a processor; and
  a storage medium, coupled to the processor, having data encoded therein, the data comprising code executable by the processor to configure the computer system into a machine for:
    receiving one or more attribute-based configuration queries from a client system;
    processing the one or more attribute-based configuration queries, configuration rules, and attribute based preference algorithm using a combined configuration rules-attributes model and a configuration-rules processing engine to calculate valid configuration answers in accordance with the combined configuration rules-attributes model, wherein a plurality of the configuration rules define relationships between parts of the product and a plurality of attributes represent details about the parts;
    predetermining values of one or more combinations of attributes associated with respective configuration answers;
    storing the predetermined values;
    retrieving the stored predetermined values associated with a particular valid configuration answer if the particular valid configuration is an answer to one or more of the attribute-based configuration queries;
    receiving a selection of at least one of the one or more product attributes to be prioritized;
    prioritizing the valid configuration answers by one or more of the plurality of attributes in the combined configuration rules-attributes model; and
    providing at least a subset of the valid configuration answers to the client system, wherein the provided valid configuration answers are prioritized by one or more of the plurality of attributes.

7. The computer system of claim 6 wherein the data further comprises processor executable code for:
  processing valid configuration answers with an attribute based preference algorithm.

8. The computer system of claim 6 wherein the code for providing at least a subset of the valid configuration answers to the client system further comprises code for providing a predetermined number of attribute-prioritized valid configuration answers to a user.

9. The computer system of claim 6 wherein the code for providing at least a subset of the valid configuration answers to the client system further comprises code for providing a user selected number of attribute-prioritized valid configuration answers to a user.

10. The computer system of claim 6 wherein the one or more attribute-based configuration queries comprise attribute-based configuration queries to configure at least one of the products from the group comprising: vehicles, computers, and financial products.

11. A non-transitory computer storage medium comprising data embedded therein to cause a computer system to generate one or more attribute prioritized configuration answers to one or more attribute-based configuration queries, wherein the data comprises code that is executable by a processor of the computer system to configure the computer system into a machine for:
  receiving one or more attribute-based configuration queries from a client system;
  processing the one or more attribute-based configuration queries, configuration rules, and attribute based preference algorithm using a combined configuration rules-attributes model and a configuration-rules processing engine to calculate valid configuration answers in accordance with the combined configuration rules-attributes model, wherein a plurality of the configuration rules define relationships between parts of the product and a plurality of attributes represent details about the parts;
  predetermining values of one or more combinations of attributes associated with respective configuration answers;
  storing the predetermined values;
  retrieving the stored predetermined values associated with a particular valid configuration answer if the particular valid configuration is an answer to one or more of the attribute-based configuration queries;
  receiving a selection of at least one of the one or more product attributes to be prioritized;
  prioritizing the valid configuration answers by one or more of the plurality of attributes in the combined configuration rules-attributes model; and
  providing at least a subset of the valid configuration answers to the client system, wherein the provided valid configuration answers are prioritized by one or more of the plurality of attributes.

12. The computer storage medium of claim 11 wherein the data further comprises processor executable code for:
  processing valid configuration answers with an attribute based preference algorithm.

13. The computer storage medium of claim 11 wherein the code for providing at least a subset of the valid configuration answers to the client system further comprises code for providing a predetermined number of attribute-prioritized valid configuration answers to a user.

14. The computer storage medium of claim 11 wherein the code for providing at least a subset of the valid configuration answers to the client system further comprises code for providing a user selected number of attribute-prioritized valid configuration answers to a user.

15. The computer storage medium of claim 11 wherein the one or more attribute-based configuration queries comprise attribute-based configuration queries to configure at least one of the products from the group comprising: vehicles, computers, and financial products.

16. A computer system to generate one or more attribute prioritized configuration answers to one or more attribute-based configuration queries, the system comprising:

means for receiving one or more attribute-based configuration queries from a client system;

means for processing the one or more attribute-based configuration queries, configuration rules, and attribute based preference algorithm using a combined configuration rules-attributes model and a configuration-rules processing engine to calculate valid configuration answers in accordance with the combined configuration rules-attributes model, wherein a plurality of the configuration rules define relationships between parts of the product and a plurality of attributes represent details about the parts;

means for predetermining values of one or more combinations of attributes associated with respective configuration answers;

means for storing the predetermined values;

means for retrieving the stored predetermined values associated with a particular valid configuration answer if the particular valid configuration is an answer to one or more of the attribute-based configuration queries;

means for receiving a selection of at least one of the one or more product attributes to be prioritized;

means for prioritizing the valid configuration answers by one or more of the plurality of attributes in the combined configuration rules-attributes model; and means for providing at least a subset of the valid configuration answers to the client system, wherein the provided valid configuration answers are prioritized by one or more of the plurality of attributes.

17. The method of claim 1:

wherein prioritizing the valid configuration answers by one or more product attributes in the combined configuration rules-attributes model further comprises prioritizing the valid configuration answers by each selected product attribute, wherein the valid configuration answers represent configurations of the product that conform to the combined configuration rules-attributes model.

18. The computer system of claim 6:

wherein prioritizing the valid configuration answers by one or more product attributes in the combined configuration rules-attributes model further comprises prioritizing the valid configuration answers by each selected product attribute, and wherein the valid configuration answers represent configurations of the product that conform to the combined configuration rules-attributes model.

19. The computer storage medium of claim 11:

wherein prioritizing the valid configuration answers by one or more product attributes in the combined configuration rules-attributes model further comprises prioritizing the valid configuration answers by each selected product attribute, and wherein the valid configuration answers represent configurations of the product that conform to the combined configuration rules-attributes model.

20. The computer system of claim 16 wherein the system further comprises:

means for receiving a selection of at least one of the one or more product attributes to be prioritized; and means for prioritizing the valid configuration answers by each selected product attribute, wherein the valid configuration answers represent configurations of the product that conform to the combined configuration rules-attributes model.

* * * * *